(12) United States Patent
Hwang et al.

(10) Patent No.: US 7,156,534 B2
(45) Date of Patent: Jan. 2, 2007

(54) BACKLIGHT MODULE

(75) Inventors: Ping-Feng Hwang, Chu-Nan, Miao-Li County (TW); Bor-Jyh Pan, Chu-Nan, Miao-Li County (TW)

(73) Assignee: Coretronic Corporation (TW)

( * ) Notice: Subject to any disclaimer, the term of this patent is extended or adjusted under 35 U.S.C. 154(b) by 61 days.

(21) Appl. No.: 11/059,464

(22) Filed: Feb. 16, 2005

(65) Prior Publication Data
US 2005/0195620 A1   Sep. 8, 2005

(30) Foreign Application Priority Data
Mar. 3, 2004  (TW) ............... 93105618 A
Sep. 10, 2004 (TW) ............... 93127566 A

(51) Int. Cl.
*F21V 7/04* (2006.01)
(52) U.S. Cl. ...................... 362/6.6; 362/559
(58) Field of Classification Search .............. 362/615, 362/616, 559, 561
See application file for complete search history.

(56) References Cited

U.S. PATENT DOCUMENTS 5,748,269 A * 5/1998 Harris et al. ............... 349/58
6,445,373 B1 * 9/2002 Yamamoto ................. 345/102
6,879,308 B1 * 4/2005 Hsieh et al. ................ 345/87
2002/0167637 A1 * 11/2002 Burke et al. ............... 349/161
2003/0234895 A1 * 12/2003 Sugawara et al. .......... 349/58

FOREIGN PATENT DOCUMENTS

TW    564302    1/2003
TW    566781    11/2003

* cited by examiner

Primary Examiner—Renee Luebke
Assistant Examiner—Julie A. Shallenberger
(74) Attorney, Agent, or Firm—Min, Hsieh & Hack LLP

(57) ABSTRACT

A backlight module includes a planar light plate with planar illumination for providing a planar light, the backlight module further including a light plate base and at least one side retaining frames that can be assembled/detached. The light plate base is disposed on one side under the light plate, and two opposite sides thereof extend upward to form two side frames for retaining two opposite sides of the light plate. The side retaining frame is sleeved on the lateral side of the opening end of the light plate base, for retaining the light plate in the light plate base.

3 Claims, 11 Drawing Sheets

BACKLIGHT MODULE

FIELD OF THE INVENTION

The present invention relates to a backlight module, and more particularly to a fixing device of a light plate in the backlight module, wherein the light plate is used as the light source of the backlight module.

BACKGROUND OF THE INVENTION

Flat display devices are gradually becoming major display devices, and because the liquid crystal display panel of a flat display device does not illuminate itself, a backlight module is needed to illuminate it. Among various light sources used in flat display devices, a direct-type backlight module is widely used as the light source of a flat display device.

In a direct-type backlight module, a plurality of fluorescent tubes is arranged in parallel as the light source, in addition, a light plate can also be used as the light source. To be used as the light source, a light plate is easier to assemble and illuminates more uniformly than fluorescent tubes.

Please refer to FIG. 1A, which shows the backlight module 3 taking the light plate 4 as the light source in the conventional art. In the light of the direct-type backlight module 3 that takes the light plate 4 as the planar light source needed by the flat display device 2, the light plate 4 is installed in the aluminum light plate base 6, and the four sides of the light plate base 6 extend upward and horizontally outward to form the side frame 602. By the side frame 602 that extends horizontally outward, the diffusing plate 8, the optical material (including diffusing film, enhancing film and protective film) 10 and the LCD panel 11 dispose on the light plate base 6. At last, the upper fixing frame 12 is installed to form the flat display device 2.

Please refer to FIG. 1B, however, generally the four sides of the light plate 4 are a non-illuminating region 4A, thus the actually effective illuminating region 4B is smaller than the overall size of the light plate 4. In the conventional installment, the light plate 4 must be put upon the light plate base 6, thus the side frame 602 formed by extending the four sides of the light plate 6 outward cannot wrap the non-illuminating region 4A at the four sides of the light plate 4, which makes the width (D) of the ineffective region to include the widths of the non-illuminating region 4A and the side frame 602. Therefore, the width (D) of the ineffective region at the sides of the flat display device 2 and the overall size of the backlight module increase, and a larger fixing frame 12 is needed to cover the ineffective region, hence increasing the material cost of the fixing frame 12. In addition, if there is a need to disassemble the flat display device 2 that is already assembled, each structural layer must be disassembled in sequence for taking out the malfunctioned light plate 4, resulting inconveniences while replacing the light plate 4.

Therefore, the main object of the present invention is to provide a structure of a backlight module, for solving the above problems by using the different structure and assembling way.

SUMMARY OF THE INVENTION

One object of the present invention is to use a fixing device of a light plate in a backlight module and make the side frame extending upward on the four sides of the light plate base to extend toward the inside of the backlight module for wrapping the non-illuminating region at the four sides of the light plate, in order to reduce the width of the ineffective region on the sides of the flat display device.

Another object of the present invention is to use a fixing device of a light plate in a backlight module and assemble the light plate from the lateral side of the backlight module, so that the light plate can still be taken out after the assembling is done.

Still another object of the present invention is to use a fixing device of a light plate in a backlight module and make the side frame directly contact with the light plate for providing the light plate a better heat-dissipating path.

Still another object of the present invention is to make the upper and lower sides of the light plate to form chambers by disposing supporting elements for providing the heat-dissipating space of the planar light plate and raising the heat-dissipating efficiency.

Still another object of the present invention is to limit the displacement of the planar light plate by disposing a light plate supporting element and a diffusing plate supporting element respectively on the upper and lower sides of the planar light plate, for protecting the light plate from being damaged.

Further features and advantages of the present invention, as well as the structure and operation of the embodiments of the present invention, are described in detail below with reference to the accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

Figure 1A:
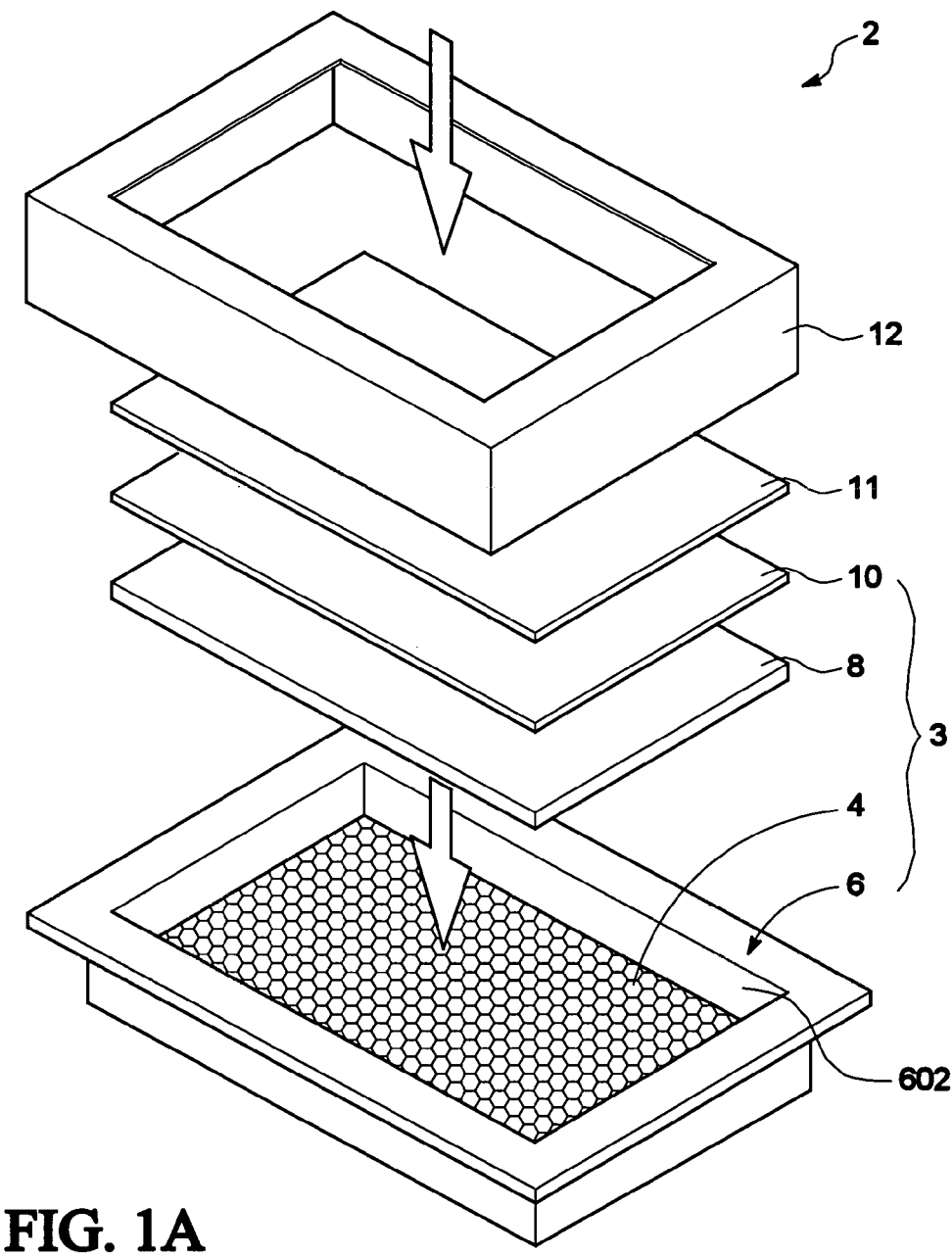
FIG. 1A is an exploded diagram showing a conventional backlight module that takes a light plate as the light source.
Figure 1B:
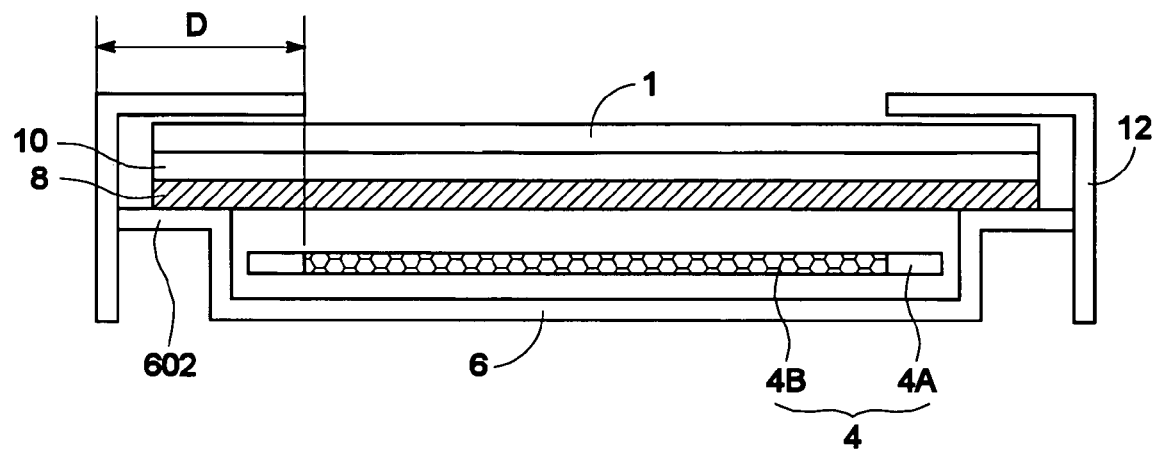
FIG. 1B is a lateral view showing a conventional backlight module that takes a light plate as the light source.
Figure 2:
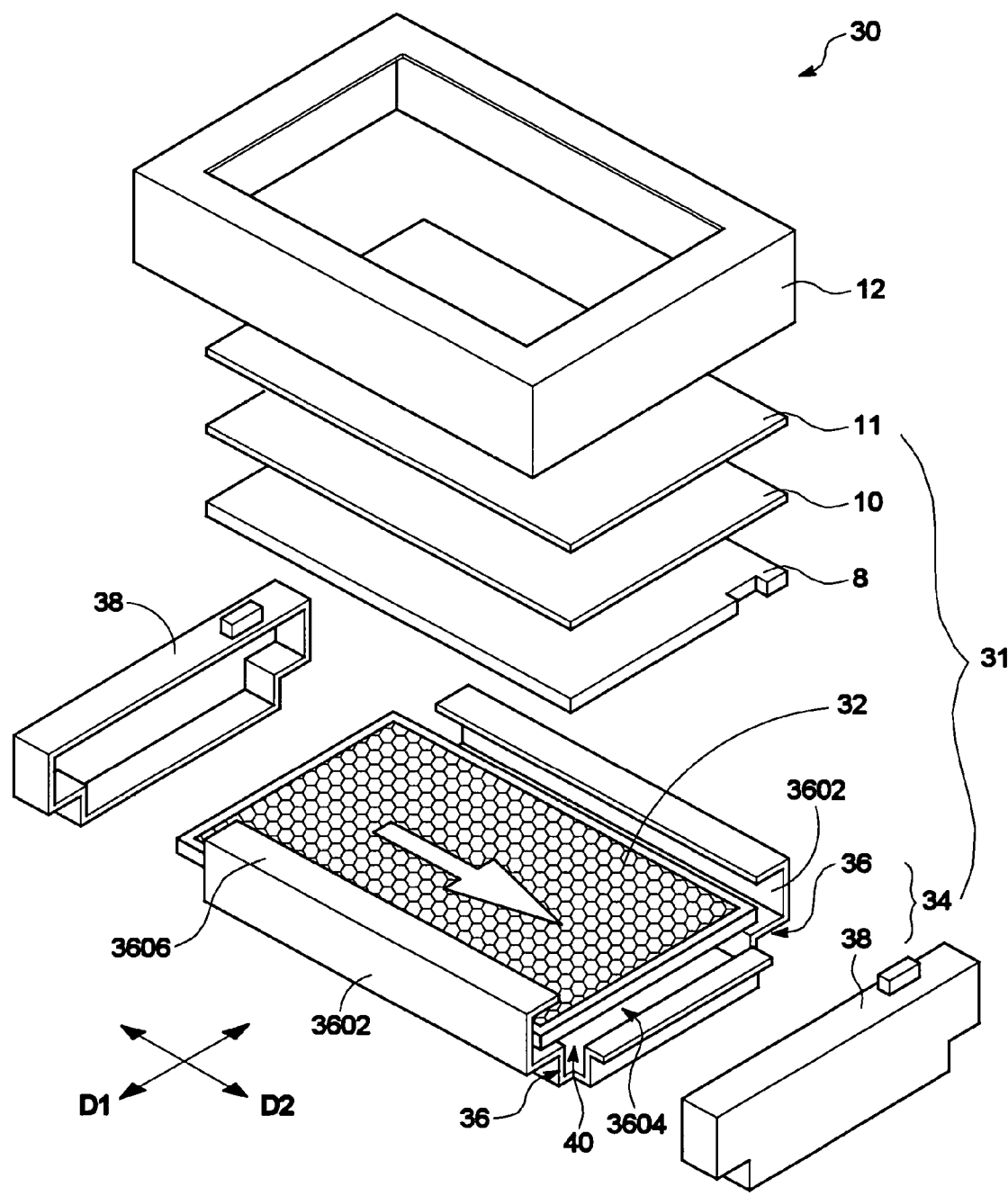
FIG. 2 is a perspective diagram showing the fixing device of the light plate in the backlight module in the present invention.

Please refer to FIG. 2. The present invention relates to a fixing device 34 for fixing a light plate 32 in a backlight module 31. The fixing device 34 includes a light plate base 36 and at least one side retaining frames 38.

The light plate base 36 is disposed under the light plate 32 and at least two opposite sides thereof extend upward to form the side frame 3602, for retaining the light plate 32 along the first direction D1 of the two-dimensional surface of the light plate 32. Then, the side frame 3602 extends horizontally inward to form the wrapping edge 3606 for disposing the diffusing plate 8 and optical material 10 thereon. The width of the wrapping edge 3606 can vary with different widths of the non-illuminating region 32A of the light plate 32, for effectively cover the non-illuminating region 32A.

Figure 4:
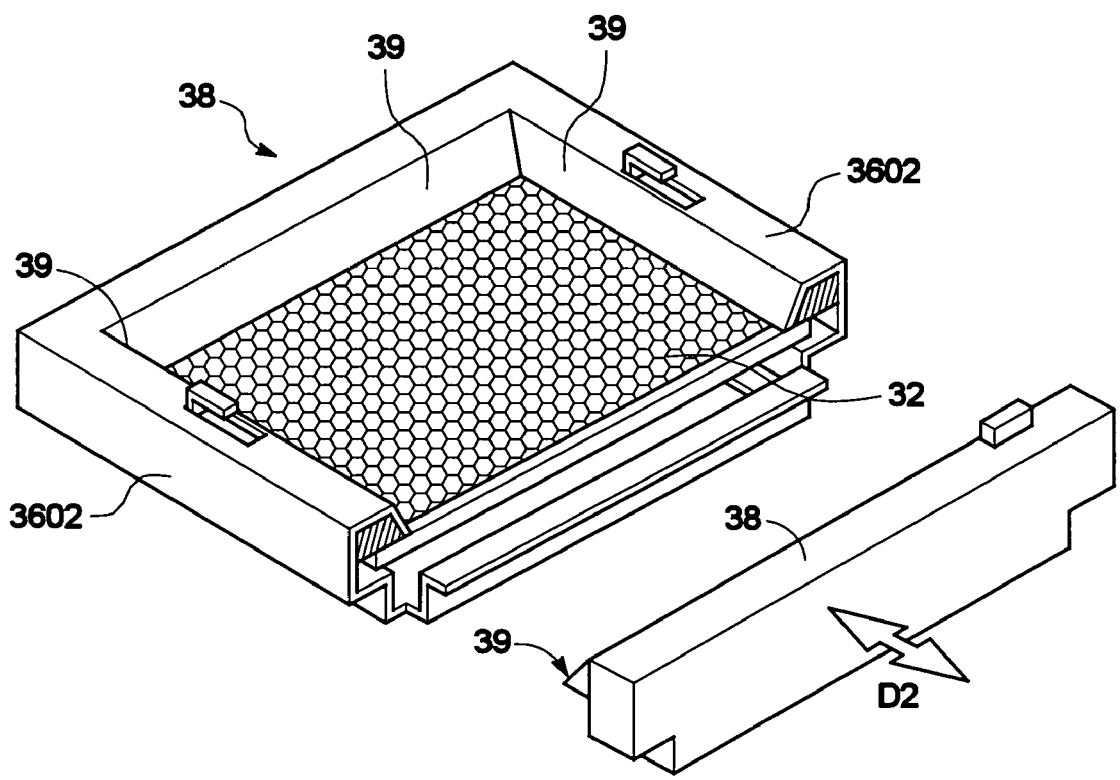
FIG. 4 is a perspective diagram showing the side retaining frame that helps the light plate to reflect lights.

The side retaining frame 38 is sleeved on the lateral side of the light plate base opening 3604 where there is no side frame 3602. In the present embodiment, the side retaining frame 38 is a sleeve edge, for wrapping the lateral side of the light plate base opening 3604 and wrapping the lateral side of the light plate 32, and thereby retaining the light plate 32 along the second direction D2 of the two-dimensional surface of the light plate 32, forming a rectangular frame with the side frame 3602 for wrapping all edges around the light plate 32. In FIG. 2 there are two light plate base openings 3604, and thus there are two side retaining frames 38. But the light plate 36 can extend upward to form three side frames 3602 and consequentially only one side retaining frame 38 is needed (as shown in FIG. 4).

The sequence for assembling the flat display device 30 is inserting the light plate 32 laterally into the side frame 3602 that is extended upward from the light plate base 36, and then sleeving the light plate base 36 with the side retaining frame 38 from the lateral side of the light plate base opening 3604, then, disposing the conventional diffusing plate 8, the optical material 10, the LCD panel 11 and the upper fixing frame 12 layer by layer in sequence on the wrapping edge 3606, for forming the flat display device 30.

In the present invention, the light plate 32 can be assembled from the lateral side of the backlight module, thus, when the light plate 32 needs replacing or repairing, only the side retaining frame 38 is needed to be removed, then the light plate 32 can be taken out from the lateral side for replacing, and during the replacing process the diffusing plate 8, the optical material 10, the LCD panel 11 and so on do not need removing, hence, it is convenient to take out the light plate after the assembling is done. In addition, because the light plate 32, the diffusing plate 8, the optical material 10, the upper frame 12, the LCD panel 11 and so on are separate, it is fast to replace the light plate 32.

Figure 3:
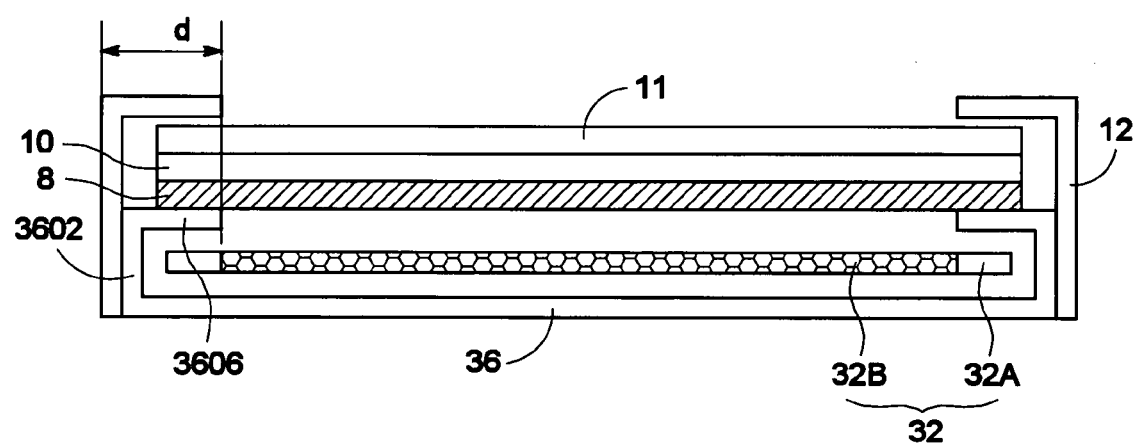
FIG. 3 is a lateral view showing the backlight module in the present invention.

Please refer to FIG. 3. The side frame 3602 has the wrapping edge 3606 that extends inward for covering the non-illuminating region 32A of the light plate 32. Compared with the width of ineffective region including the non-illuminating region 4A and the side frame 602 in the convention art wherein the side frame extends outward, the width (d) of the ineffective region of the flat display device of the invention includes only the width of the wrapping edge 3606 of the side frame 3602 and is smaller than the width (D) in the conventional art, consequently the edge width of the fixing frame 12 can be reduced and thereby the cost of material for the fixing frame 12 can be lowered. In the invention, the portion that extends inward can wrap the edges of the light plate 32 at the same time, hence, the edge width (d) not for displaying of the flat display device is smaller than that in the conventional art, and is more pleasing to the eye. The volume of the flat display device 30 is also reduced under the condition that the display size is maintained the same.

FIG. 4 is a perspective diagram showing the side retaining frame 38 that helps the light plate 32 to reflect lights. Further, the contact portion of the side retaining frame 38 and the light plate 32 can be designed to be a light-reflecting inclined surface 39. Consequently, besides locating the light plate 32 and helping heat-dissipation, the light-reflecting inclined surface 39 helps to reflect upward lights scattered from the lateral side of the light plate 32, for improving the brightness distribution on the visible region of the backlight module. In addition, the contact portion of the side frame 3602 and the light plate 32 can also be designed to be a light-reflecting inclined surface 39, for providing the same effect.

Figure 5:
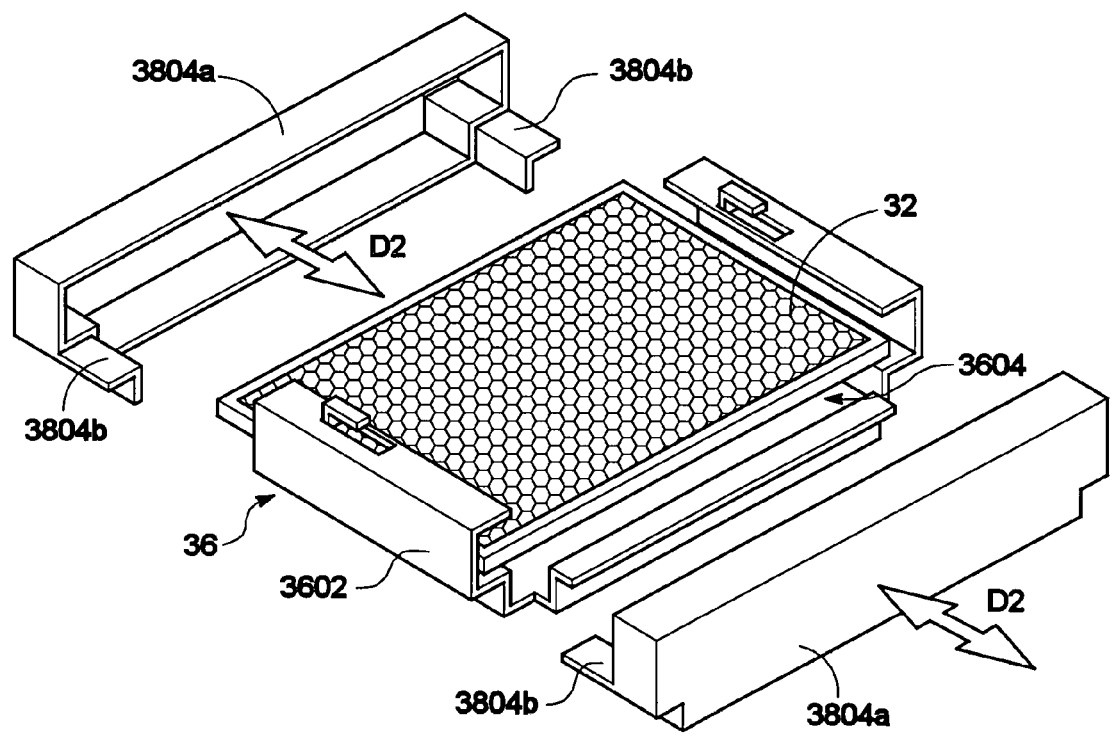
FIG. 5 is a perspective diagram showing the second embodiment of the side retaining frame in the present invention.

Please refer to FIG. 5. FIG. 5 is a perspective diagram showing the second embodiment of the side retaining frame 38 in the present invention. The side retaining frame 38 can be an edge strip 3804a. Two parallel tenons 3804b are extended orthogonally from the two ends of the edge strip 3804a, for being inserted into the end holes of the side frame 3602 near the light plate base opening 3604 from the light plate base opening 3604, or for being attached on the surface of the light plate base 36 with additional screws and so on (not shown in the FIG.) used to fix the tenons 3804b and the light plate base 36. Thereby, the edge strip 3804a retains the light plate 32 along the second direction D2 and forms a rectangular frame with the side frame 3602 for wrapping all edges around the light plate 32. Further, as described above with reference to FIG. 2, there can be three side frames 3602 extending upward in FIG. 5, and thereby only one edge strip 3804a is needed.

Figure 6:
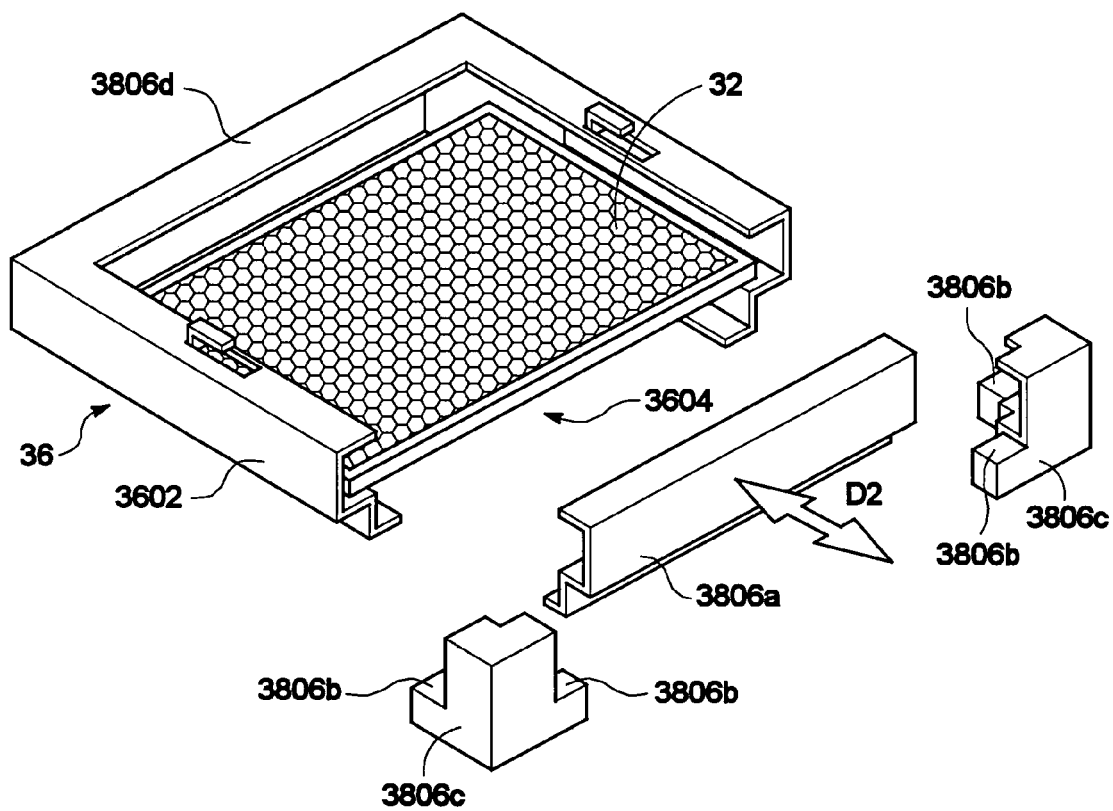
FIG. 6 is a perspective diagram showing the third embodiment of the side retaining frame in the present invention.

Please refer to FIG. 6. FIG. 6 is a perspective diagram showing the third embodiment of the side retaining frame in the present invention. The side retaining frame 38 can be an edge strip 3806a and two corner fixing elements 3806c. The edge strip 3806a wraps the light plate 32 from the lateral side of the light plate base opening 3604 and retains the light plate 32 in the second direction D2. An edge strip 3806d can be directly extended upward from the light plate base 36 and form a frame with the side frame 3602 for wrapping the three sides around the light plate 32. At this time, the edge strip 3806 is the same as the side frame 3602 mentioned previously. But a lateral side of the light plate base opening 3604 must be reserved for the edge strip 3806a and the two corresponding corner fixing elements 3806c to fix the light plate 32.

Two tenons 3806b are extended orthogonally from the corner fixing element 3806c, for being inserted respectively into the end holes of the side frame 3602 near the light plate base opening 3604 and inserted into the holes at the ends of the edge strip 3806a, or for being attached on the surface of the light plate base 36 and the surface of the edge strip 3806a with additional screws and so on (not shown in the FIG) used to fix the tenons 3806b, the light plate base 36 and the edge strip 3806a. Thereby, the edge strip 3806a is retained by two corner fixing elements 3806c, and the two edge strip 3806a retains the light plate 32 along the second direction D2 and forms a rectangular frame with the side frame 3602 and the edge strip 3806d for wrapping all edges around the light plate 32.

Figure 7:
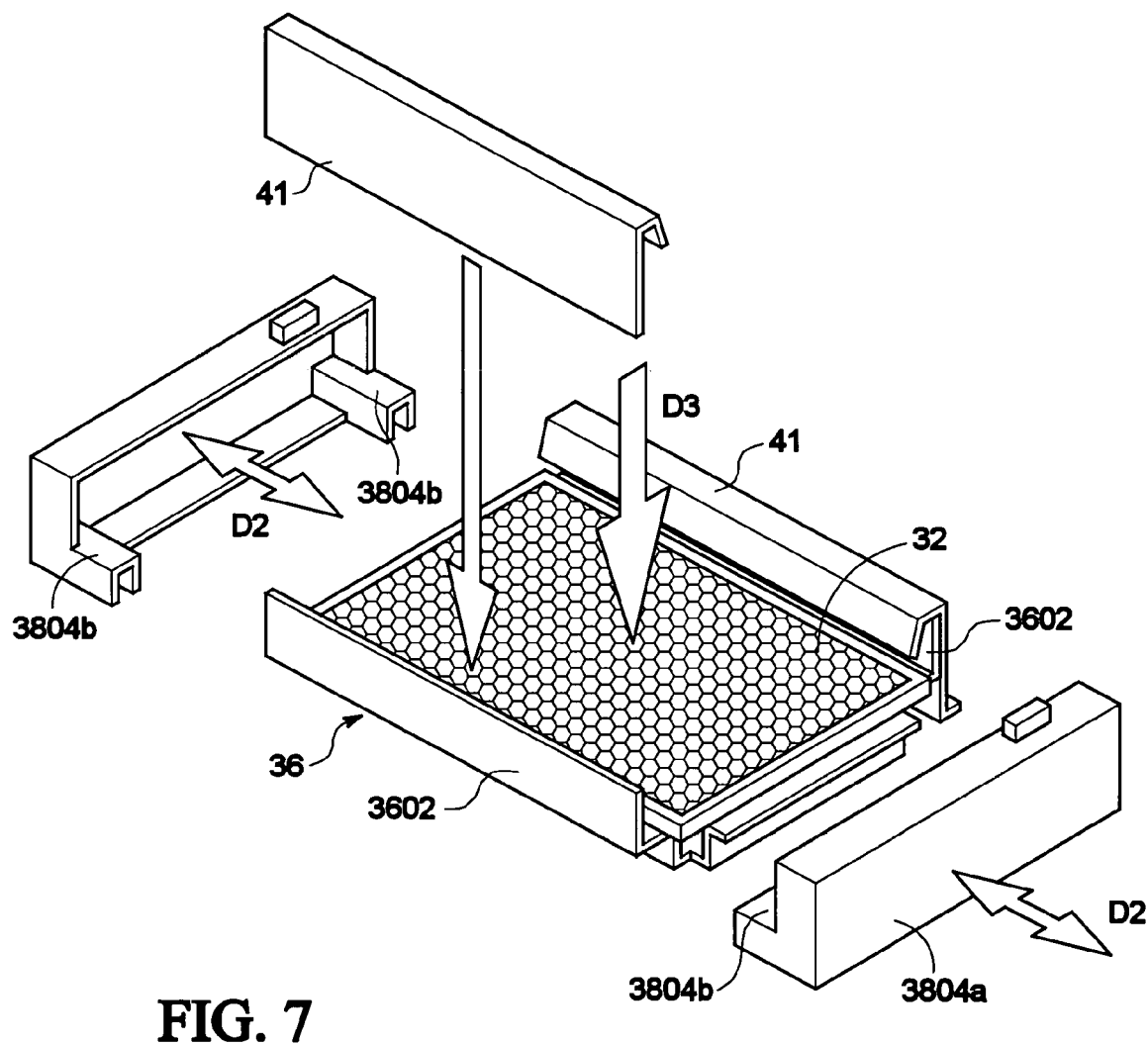
FIG. 7 is a perspective diagram showing the first embodiment of the side frame in the present invention.

Please refer to FIG. 7. FIG. 7 is a perspective diagram showing the first embodiment of the side frame in the present invention. The side frame 3602 can be movably connected with a side sleeving frame 41. The embodiment of using the side retaining frame 38 in FIG. 5 is taken for illustration altogether. The fixing device 34 for the light plate further includes two side sleeving frames 41 covering upon the two side frames 3602 respectively. The upper part of each side sleeving frame 41 extends toward the inside of the backlight module 30 to wrap the edge of the light plate 32, for retaining the light plate 32 and increasing the cooling efficiency by contact and heat-conduction of the side sleeving frame 41 and the light plate 32. Thereby, there is an additional advantage that the light plate 32 can not only be installed from the lateral side as described above, but also from the upper side in the direction D3 upon the light plate base 36. In addition, the four edges of the light plate base 36 can directly extend upward to form the side frame 3602; thereby the side retaining frame is not needed and four side sleeving frames can be used, or four side sleeving frames can become one single frame and while assembling the light plate 32 is installed into the light plate base 36 first, then the side sleeving frame is installed.

Figure 8:
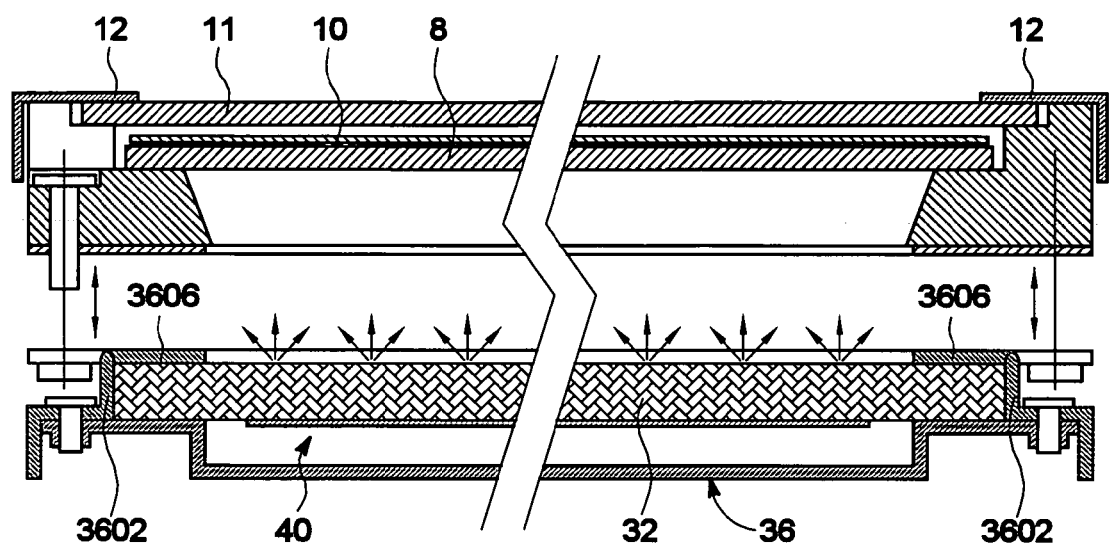
FIG. 8 is a perspective diagram showing the second embodiment of the side frame in the present invention.

Please refer to FIG. 8, which is the perspective diagram showing the second embodiment of the side frame 3602 in the present invention. In this embodiment, the side frame 3602 helps cooling the light plate 32, wherein the upper edge of the side frame 3602 extends a wrapping edge 3606 toward the inside of the backlight module 30 for wrapping the non-illuminating region 32A on the edge of the light plate 32, and for retaining the light plate 32. The inner surface of the wrapping edge 3606 contacts with the light plate 32 in order to increase the contact area. The heat generated from the light plate 32 is conducted to the light plate base 36 for convection with outside air and thereby increasing the cooling effect and lowering the temperature of the light plate 32. The light plate base 36 under the light plate 32 is concaved toward the opposite direction of the light plate 32 for forming a cooling space 40. The cooling space 40 and the wrapping edge 3606 both help increase the cooling effect.

Figure 9:
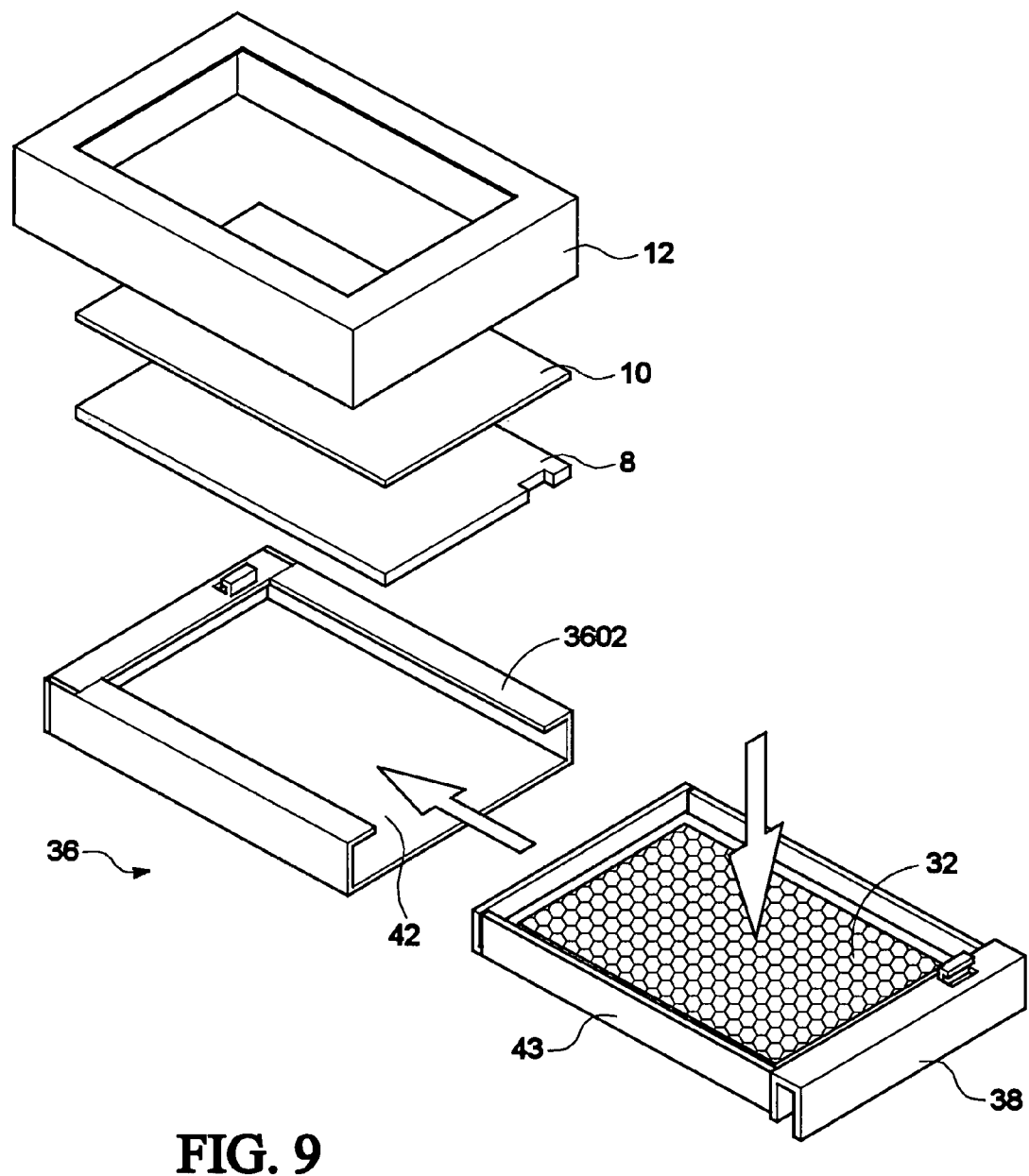
FIG. 9 is a perspective diagram showing the third embodiment of the backlight module in the present invention.

Please refer to FIG. 9. The light plate base 36 has an opening 42 on the lateral side. The three sides of the light plate base 36 extend upward and horizontally inward to form the side frame 3602. The space surrounded by the side frame 3602 is a groove, and the light plate 32 is installed in a case 43 to form a drawable light plate module. Through the opening 42, the light plate 32 is slipped into the light plate base 36 along the groove formed by the side frame 3602, and then the diffusing plate 8, the optical material 10 and so on are disposed upon the side frame 3602 of the light plate base 36 in sequence to form a backlight module. When the light plate 32 is damaged and need replacing, only the light plate 32 is needed to be drawn out from the opening 42 on the lateral side of the light plate base 36, and then the quick replacement of the light plate 32 can be achieved without unloading the diffusing plate 8, the optical material 10 and so on. There can be a side retaining frame 38 on the same side or the opposite side of the opening 42.

The light plate base in the present invention extends inward to form the side frame 3602, in comparison with the conventional side frame that extends outward, the inward extension in the invention is used to wrap the edges of the light plate 32 at the same time, thereby making the non-display edges of the flat display device 30 narrower than those in the conventional art, and are more pleasing to the eye. The volume of the flat display device 30 is also reduced under the condition that the display size is maintained the same.

Consequently, by the structure of the backlight module 30 of the present invention, using the light plate base 36 with a lateral opening and a side retaining frames 38 that is movable for assembling, the light plate 32 can be assembled from the lateral side. Not only the side frame 3602 extending upward around the light plate base 36 can extend inward toward the inside of the backlight module 30 for wrapping the four sides of the light plate 32 and increasing the cooling efficiency, but also the light plate 32 can be easily removed from the backlight module that has already assembled. In addition, the inward extending sides provide more stable locating and retaining for the light plate 32.

Figure 10:
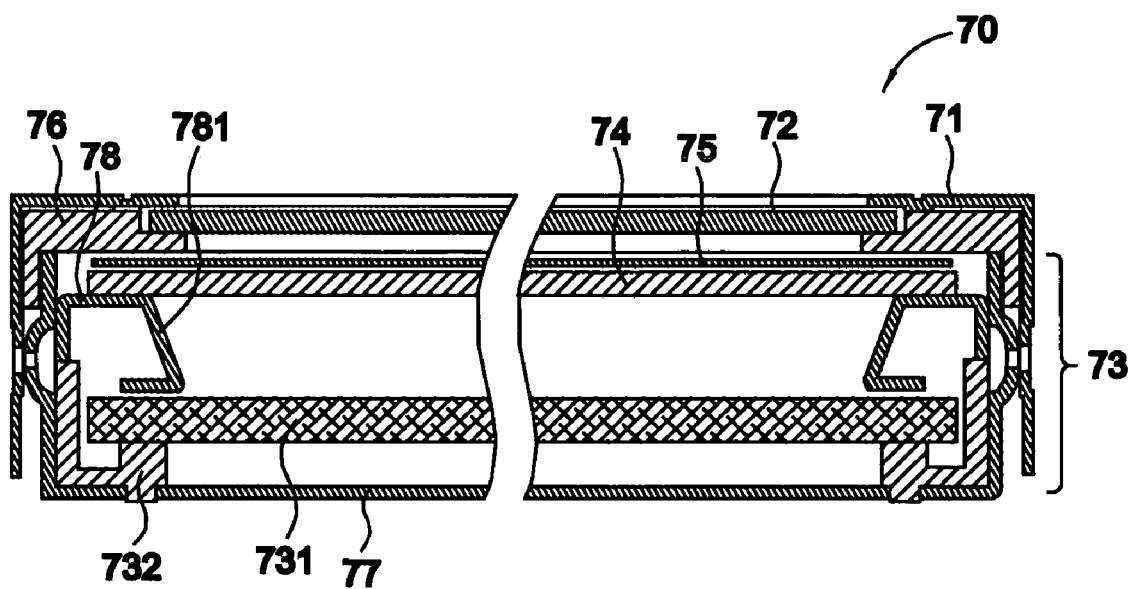
FIG. 10 is a cross-sectional diagram showing the fourth embodiment of the backlight module in the present invention.

Further, please refer to FIG. 10. FIG. 10 is a cross-sectional diagram showing the fourth embodiment of the backlight module in the present invention. The display device 70 includes an upper fixing frame 71 for wrapping the display panel 72 and the backlight module 73. The backlight module 73 is a direct-type backlight module installed under the display panel 72, and includes a planar light plate 731 with a planar illumination for providing a planar light. The planar light plate 731 can be a planar discharge lamp, a luminescent plate or a light plate composed of a plurality of LEDs arranged closely. A light plate supporting element 732 is installed on the lower lateral side of the planar light plate 731 for supporting, protecting and cushioning the planar light plate 731. A diffusing plate 74 is disposed between the planar light plate 731 and the display panel 72 for scattering the planar light generated from the planar light plate 731 to the display panel 72. An optical material 75 is disposed between the diffusing plate 74 and the display panel 72, and includes a diffusing sheet for uniformly mist the light projected by the planar light plate 731, or includes a light-enhancing plate for condensing the light on the central viewable region of the display panel 72. The number and kinds of the diffusing plate and the light-enhancing plate can be determined according to each design. The components of the backlight module 73 include an upper cover 76 and a back cover 77 made of metal materials for forming a chamber with the upper cover 76 for containing the planar light plate 731, the diffusing plate 74, the optical material 75 and so on. The backlight module 73 further includes a diffusing plate supporting element 78 disposed between the diffusing plate 74 and the planar light plate 731 for supporting the diffusing plate 74 and the optical material 75 thereon, and for retaining the planar light plate 731 not to move toward the display panel 72.

Please continue referring to FIG. 10. The diffusing plate supporting element 78 is disposed between the diffusing plate 74 and the planar light plate 731, thus the chamber is formed between the diffusing plate 74 and the planar light plate 731 for providing the planar light plate 731 a heat-dissipating space. The diffusing plate supporting element 78 includes a reflecting surface 781 for reflecting lights generated by the planar light plate 731 to the diffusing plate 74, in order to make the light received by the sides of the display panel 72 more uniform and increase the viewable region of the display panel 72. Besides, the light plate supporting element 732 is disposed between the back cover 77 and the planar light plate 731 for supporting the planar light plate 731, and also for forming a chamber between the back cover 77 and the planar light plate 731 to provide the planar light plate 731 a heat-dissipating space and thereby the best illumination efficiency.

In conclusion, for the cooling of the backlight module 73, the light plate supporting element 78 is disposed between the back cover 77 and the planar light plate 731, and a chamber is formed between the back cover 77 and the planar light plate 731, as well as the diffusing plate supporting element 78 is disposed between the diffusing plate 74 and the planar light plate 731, and a chamber is formed between the diffusing plate 74 and the planar light plate 731, thereby providing the planar light plate 731 heat-dissipating spaces. For the structure strength of the light plate 73, the light plate supporting element 732 and the diffusing plate supporting element 78 can keep the planar light plate 731 from displacing and protect the planar light plate 731.

While this invention has been described in the context of preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope invention.

What is claimed is:

1. A backlight module, comprising:
   a light plate for outputting a planar light;
   a light plate base disposed under the light plate, two opposite sides of the light plate base extending upward respectively to form two side frames; and
   at least one side sleeving frame movably sleeving on the lateral side of the side frames, an upper part sleeving frame extending toward the inside of the backlight module for wrapping the edge of the light plate in order to retain the light plate,
   and wherein the upper part of the side sleeving frames extends toward the inside of the backlight module to contact with the light plate for increasing the cooling effect.

2. The backlight module according to claim 1, wherein the inner surface of the side sleeving frame is an inclined or vertical light-reflecting surface for reflecting the light from the light plate.

3. The backlight module according to claim 1, further comprising at least one side retaining frame movably sleeving on the lateral side of an opening in the light plate base and the side frame being made to retain the light plate in the light plate base.

* * * * *